July 20, 1965     L. W. PARKER     3,196,348
WIDE BAND A.C. MEASURING INSTRUMENT EMPLOYING A WOBBLED
HETERODYNING CIRCUIT TO CONVERT HIGH INPUT FREQUENCIES
TO MEASURABLE LOWER FREQUENCIES
Filed Aug. 2, 1960
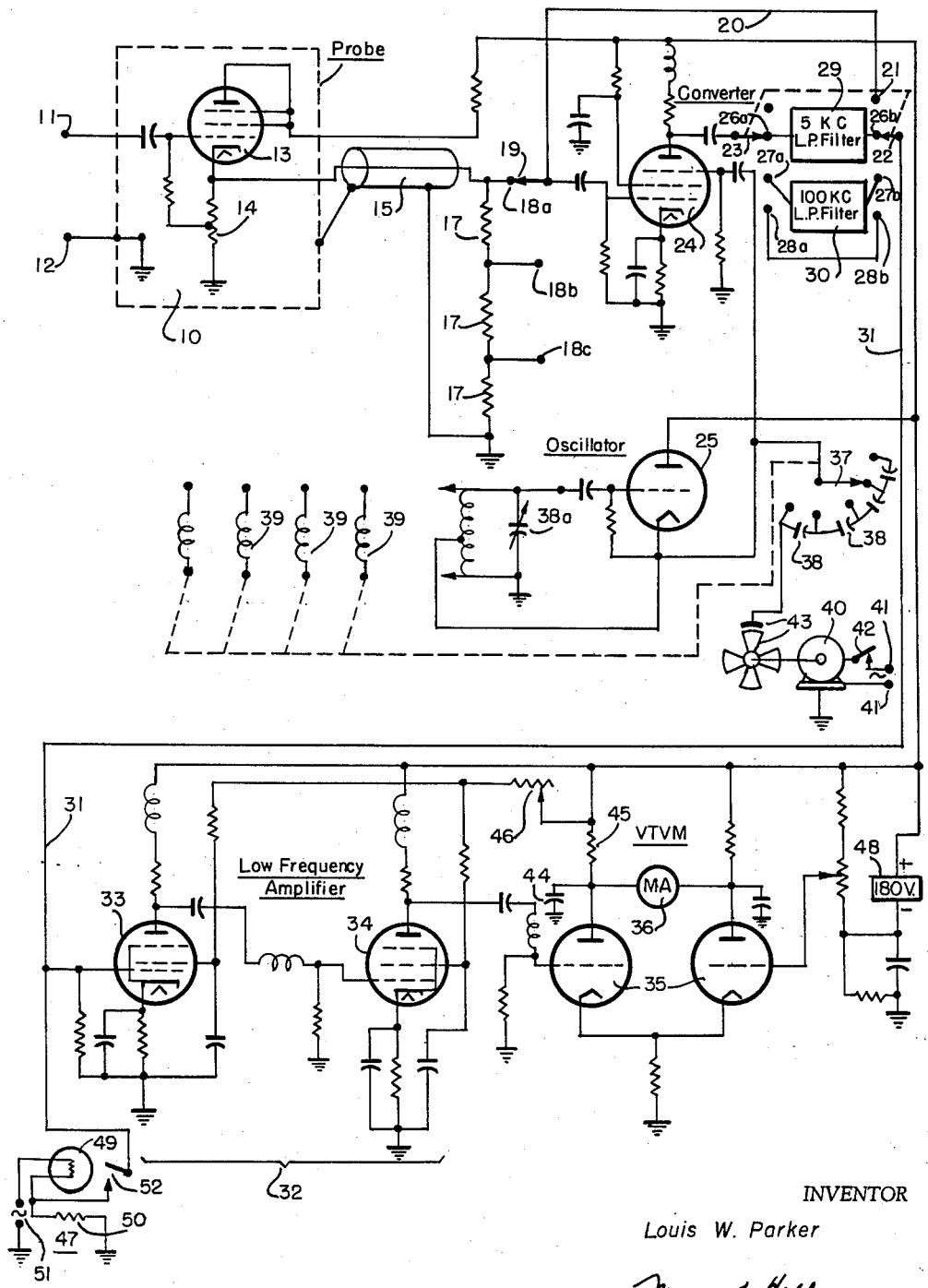
INVENTOR
Louis W. Parker
BY
ATTORNEYS

United States Patent Office 3,196,348
Patented July 20, 1965

3,196,348
WIDE BAND A.C. MEASURING INSTRUMENT EMPLOYING A WOBBLED HETERODYNING CIRCUIT TO CONVERT HIGH INPUT FREQUENCIES TO MEASURABLE LOWER FREQUENCIES
Louis W. Parker, 375 Fairfield Ave., Stamford, Conn.
Filed Aug. 2, 1960, Ser. No. 46,915
5 Claims. (Cl. 324—120)

The present invention relates to measuring instruments of the vacuum tube type; and is more particularly concerned with an improved instrument of the vacuum tube voltmeter type having a wider range of operation and more diverse functions than has been possible in any single measuring instrument suggested heretofore.

In various forms of electronic work, particularly radio development work, it is often desired to measure signals having different intensities as well as signals having widely different frequencies. By way of example, radio and television receivers may have signals of widely different frequencies in various portions thereof; and the antenna associated with a receiver such as a television receiver may in turn have signals thereon which are of appreciably lower amplitude than, and of appreciably different frequencies from, other signals in the receiver itself. By reason of these differences in frequency and amplitude of signal which may occur in any given single installation, one working with or servicing such equipment is normally required to have several measuring instruments. Moreover, in such a single installation, when the actual parameter being measured is changed, i.e., from voltage measurement to frequency measurement or harmonic analysis, still further instruments are normally employed whereby a given servicing or development problem may require a number of pieces of expensive equipment.

The present invention, recognizing these characteristics of instruments presently available, is concerned with an instrument circuit adapted to perform, in a single instrument, the functions normally required of several instruments at the present time. In this respect, the circuit of the present invention is adapted to measure RF voltages from 10 microvolts upward, between frequency ranges of 10 cycles to 250 megacycles or even higher, wherefore the instrument is adapted to be employed as an RF voltmeter having an appreciably greater sensitivity and a substantially wider range of operation in a single instrument than has been possible heretofore. Such a voltmeter can in effect measure the signals present in a receiving antenna, as in apartment house antenna systems, and is most useful in radio development work and servicing, since it can measure the signal in every part of a receiver which was not heretofore possible.

Moreover, as will be discussed hereinafter, the instrument of the present invention is so arranged that it is able to select, either broadly or sharply, a frequency or band of frequencies to be measured; and as a result, the same instrument which is employed for the voltage measurements discussed above can also be employed as a harmonic analyzer, a field strength meter, or a frequency meter.

It is accordingly an object of the present invention to provide an improved RF voltmeter having greater sensitivity and a wider frequency range of operation than has been possible heretofore.

Another object of the present invention resides in the provision of an improved measuring instrument capable of use as a voltmeter, a harmonic analyzer, a field strength meter or a frequency meter, all in the same instrument.

A still further object of the present invention resides in the provision of a vacuum tube measuring instrument having an improved circuit roughly resembling that of a multiband superheterodyne radio receiver; and in this regard it is a particular purpose of the invention to provide an instrument of this type wherein the image signal, normally present in all superheterodyne receivers, is eliminated as a factor in accurate measurements.

Still another object of the present invention resides in the provision of an improved measuring instrument having a greater breadth of tuning than has been possible in any single instrument suggested heretofore.

A further object of the present invention resides in the provision of an improved measuring instrument having a varying degree of selectivity down to and including a few cycles.

A still further object of the present invention resides in the provision of a measuring instrument of particular use in radio and television development and servicing applications and capable, in the single instrument to be described, of measuring signals of varying strengths and frequencies in every part of a receiver.

A still further object of the present invention resides in the provision of an instrument capable of selecting either broadly or sharply the frequency or band of frequencies to be measured, wherefore said instrument can be employed not only in the measurement of parameters for serving and development work, but can also be employed as an aid to analysis of signals present.

A still further object of the present invention resides in the provision of a measuring instrument including a circuit adapted to heterodyne incoming signals with locally generated signals during a measuring operation, and arranged to permit this heterodyning operation to be eliminated when such is not desired.

In providing for the foregoing objects and advantages, the present invention contemplates the provision of an improved highly sensitive RF voltage meter and analyzer comprising a circuit which includes a local oscillator adapted to provide a signal beating with a signal being measured, in a converter forming a portion of the circuit. Signals to be measured can be applied to the converter for such heterodyning purposes, or can be by-passed around the converter when such heterodyning is not desired. The output of the converter (not the signal present at the input of the converter when heterodyning is not employed) is coupled to a low frequency amplifier and thence to a vacuum tube voltmeter as will be described hereinafter.

One of the particular features of the invention resides in the arrangement of the oscillator mentioned above; and in particular the system to be described includes an arrangement for preventing erroneous readings on the voltmeter due to possible oscillator drift in the instrument or frequency drift of the incoming signal, as well as possible errors due to non-linear gain of the low frequency amplifier mentioned at its low frequency end. To this effect, as will be described, the instrument of the present invention includes means for wobbling the frequency of the oscillator during a measurement operation, in combination with a vacuum tube voltmeter of essentially the peak reading type; thereby eliminating possible errors, as will be described hereinafter.

The foregoing objects, advantages, construction and operation will become more readily apparent from the following description and accompanying drawing.

In particular, the instrument constructed in accordance with the present invention utilizes a probe 10 adapted to engage at a point 11 a circuit point wherein the frequency or voltage of a signal, present between said point 11 and ground 12, is to be measured or analyzed. Probe 10 includes a cathode follower 13 and the output of said cathode follower appearing across cathode resistor 14 is applied via a low impedance coaxial cable 15 to a plurality of series-connected multiplier resistors 17 supplied with tap-off points 18a, 18b and 18c, etc., there being as many such tap-off points and resistors 17 as may be desired. A switch arm 19 is provided to engage any selected one of the tap-off points 18a–18c, depending upon the attenuation desired of an incoming signal, whereafter, as is conventional, the output reading of the instrument is multiplied by an appropriate factor corresponding to the actual position of switch arm 19 during the measuring operation.

Signals present on switch arm 19 may be coupled via a line 20 to a switch point 21 cooperating with a further switch arm element 22, whereby signals present on switch arm 19 can bypass the converter (to be described) when measurement of the actual signal (e.g., a low frequency signal) is desired without heterodyning. The signal present on switch arm 19 is also coupled to one input, i.e., the control grid, of a converter tube 24; and this same converter tube 24 has a locally generated signal, produced by an oscillator 25, supplied to the suppressor grid thereof. When the converter-oscillator arrangement 24–25 is therefore being used, the incoming signal present on switch arm 19, which may be at an unknown frequency, is converted to a lower frequency constituting the difference between the frequency output of oscillator 25 and that of the incoming signal, with this difference frequency appearing at the output of converter tube 24 on a switch arm 23.

Switch arms 22–23 are ganged to one another, as illustrated, and are associated in turn with the contact 21 mentioned previously, as well as with further pairs of contacts 26a–26b, 27a–27b and 28a–28b. When the gang switch 21–23 is moved to its uppermost position, i.e. in engagement with contact 21, the signal present on switch arm 19 is bypassed around converter 24 for direct measurement as already discussed. The switch arms 22, 23 can also engage contacts 26a–26b, whereby the output of converter 24 is measured via a five kilocycle low-pass filter 29, thereby permitting the measurement of a relatively sharply selected band of frequencies. Switch arms 22, 23 can also be moved into engagement with contacts 27a–27b, whereby the output of converter 24 is measured via a 100 kc. low-pass filter 30, thereby permitting the measurement of a somewhat broader band of frequencies; and finally, switch arms 22, 23 can be moved into engagement with contacts 28a–28b, whereby the entire band of frequencies appearing at the output of converter 24 may be measured without any restriction due to the interposition of a low-pass filter.

The signal appearing on switch arm 22, taken from one of the points 21, 26b, 27b or 28b (having the different characteristics already described), is coupled via line 31 to the input of a low frequency amplifier 32 comprising cascade-connected amplifier stages 33 and 34 connected as illustrated. After amplification, the signal is coupled from the output of amplifier stage 34 to a vacuum tube voltmeter 35 associated with a meter movement 36 so as to give an appropriate reading. The details of vacuum tube voltmeter 35 are shown on the figure for illustrative purposes only, it being understood that other forms of peak voltmeter may be used (as will be discussed hereinafter).

The circuit of the present invention is intended to measure various frequencies between the ranges of ten cycles and several hundred megacycles, and the heterodyning operation described is intended to permit the low frequency amplifier 32 to measure any frequency within these ranges. As is well known in conventional superheterodyne receivers, the low frequency output of a converter, produced by heterodyning of an incoming signal with a locally generated signal, can be produced when the local oscillator is either higher or lower than the incoming signal in frequency. It is intended that the low frequency amplifier 32 be able to amplify fairly uniformly between frequencies of ten cycles and one megacycle, which is well within the ability of amplifiers known at the present time. By reason of the image signals which could be produced, however, when the local oscillator 25 is operating above or below the incoming signal, and by reason of the frequency range to be measured as well as the inherent non-linearity which may be present in the low frequency amplifier such as 32, some errors in measurement might occur in the absence of the arrangement to be described hereinafter.

The actual frequency output of the oscillator 25 is controlled by a band switch 37 cooperating with a series of capacitors 38 and a series of inductances 39 adapted to change the frequency of oscillator 25 in conventional manner to any of several bands, with tuning within a selected band being effected by capacitor 38a. The actual frequency output of oscillator 25 may thus be selected at any one of various widely differing frequencies, inasmuch as it is desired to measure frequencies up to several hundred megacycles. Merely by way of example, let us assume that the incoming signal at point 11 has a frequency of 10 mc. (although, for reasons stated, it might be substantially higher or substantially lower). Recognizing that the low frequency amplifier 32 is able to amplify fairly uniformly between ten cycles and one megacycle, the band switch 37 should be so positioned as to provide a heterodyned output from converter 24, resulting from a beating of this assumed 10 megacycle input with the locally generated signal, within the linear range of the amplifier 32, i.e., between ten cycles and one megacycle.

By reason of these assumed figures, it will immediately be noted that a 10 mc. incoming signal could be received and measured with the oscillator 25 operating between 9,000 kc. (i.e. 9 mc.) and 9,999.99 kc.; and this same 10 mc. incoming signal could also be received and measured when the oscillator is operating between 10,000.01 kc. and 11,000 kc. Stating the proposition in another way, it should be noted that the local oscillator 25 can have its output selected by band switch 37 to provide a locally generated frequency varying, i.e., having a frequency, anywhere between 9 and 11 mc., except for a 20-cycle gap in the middle of this band where the beat frequency would be less than ten cycles.

The foregoing 20-cycle gap in the middle of the acceptance band is inconvenient from the standpoint of the operator. It may happen, for example, that the operator adjusts the frequency dial or band switch 37 to a highest amplitude on the voltmeter 36 and thereafter leaves it set at this position during a series of measurements. Due to oscillator drift in the instrument, or in the incoming signal, the actual beat frequency output of converter 24 may in fact approach zero beat without the operator's awareness thereof. The result of such drift would be a lower and erroneous reading on the voltmeter 36. Moreover, the low frequency amplifier 32 is normally such that its gain reduces as it approaches the low frequency end thereof, wherefore the inaccuracy of the voltmeter readings will be aggravated due to drift of frequencies tending to produce a beat frequency approaching zero beat. The arrangement of the present invention is intended to eliminate these undesirable effects arising from the 20-cycle gap in the middle of the acceptance band.

To the foregoing effect, the output of oscillator 25 is preferably wobbled a few kilocycles at a comparatively slow rate such as 30 to 60 times per second. Such wobbling may be accomplished by a structure such as a small motor 40 energized at 41 under the control of a switch 42 and driving a small capacitor 43 coupled to the fixed capacitors 38 discussed previously. Even if the incoming signal or oscillator should drift in frequency therefore, whereby the heterodyned output of converter 24 would normally tend to approach zero beat, the operation of the frequency wobbling structure 40–43 causes the output of converter 24 to pass, at least 30 times per second, through a value where the gain of the low frequency amplifier 32 is normal, i.e., through the desired frequency between ten cycles and one mc.

The vacuum tube voltmeter, which is biased near plate current cut off, includes a large condenser 44 and a high resistance 45 in its plate circuit, as illustrated; and as a result, the provision of impedances 44–45 causes the vacuum tube voltmeter 35–36 to measure essentially only the peak of any voltage wave applied to it so long as these peaks are repeated often enough. As a result, spurious operation due to the possible existence of image frequencies, and erroneous readings due to possible drift in incoming signals or local oscillator signals, as well as to the non-linearity of the low frequency amplifier at its low end, are eliminated.

The frequency wobbling structure may take various different forms; and in the specific form illustrated the motor 40 may in fact comprise a 900 r.p.m. synchronous motor such as is employed in electric clocks. In order that the frequency wobble be no more than a few kilocycles, it is necessary to insert a small fixed capacitor in series with the rotating capacitor 43 on the higher frequency bands; and the capacitors 38 supply this function, being selected automatically by band switch 37. The frequency wobble will also change from one end of the band to the other; but, due to the great tolerance which is entirely permissible, it is not necessary to compensate for it.

It will be appreciated, of course, that the rotating condenser 43, comprising a portion of the frequency wobbling structure, may be replaced by other arrangements for varying the output frequency of oscillator 25. Such other arrangements include condensers using a barrier layer on a semiconductor, which layer is varied by a varying potential at low frequency so as to result in a varying electrostatic capacity which can be employed to frequency modulate the oscillator. Other means can be employed using partially saturated iron cores or mechanical means such as a motor of a dynamic speaker varying the distance between two plates; and indeed reactance tube circuits could be employed. All of these means are, per se, well known to those skilled in the art and accordingly will not be described in further detail here, it being obvious that any of various methods known can be employed to vary the output frequency of oscillator 25 in the manner described.

In many measurements, the frequency of incoming signal is known or is unimportant; and in such cases, it is desirable to make the frequency adjustment of the instrument as broad as possible. Such measurement can be accomplished by connecting switch arm 22 to either point 21 or to point 28b, depending upon the actual frequency being measured. When the converter 24 is in operation, and a very broad band of frequencies is being measured, i.e., switch arm 22 engages point 28b, any oscillator adjustment between 9 and 11 mc. (for the assumed 10 mc. input) will give the same result on meter 36. Indeed, it is not possible to get voltage readings on any other point of the dial or band switch 37, whereby the operation of the instrument becomes very simple and foolproof.

If, however, it is desired to separate the frequency being measured from other frequencies located not more than 1 mc. away, the low-pass filters 29 and 30 can be effectively employed to provide such segregation. The five kc. low-pass filter 29, when utilized, will, of course, cut off all frequencies above 5 kc., thereby providing a bandpass width on the RF of 10 kc.; and by the same token, the 100 kc. low-pass filter 30 (when employed) will cut off all frequencies above 100 kc. so as to give a bandpass width of 200 kc. In the above example of a 10 mc. signal being measured, the oscillator 25 may be caused to operate anywhere between 9.995 mc. to 10.005 mc. when the 5 kc. filter 29 is in use; and the oscillator may also be caused to operate anywhere between 9.9 mc. and 10.1 mc. when the 100 kc. filter 30 is in use.

It will be appreciated that the band selection effected by filters 29 and 30 is rather sharp. However, in some cases it may not be sharp enough. The invention described makes it possible to have any degree of selectivity even down to 100 cycles, simply by providing a low-pass filter designed to cut off at an appropriately low frequency; and to this effect it must be noted that the filters 29 and 30 can be provided to have materially different bandpasses than those described, or can be supplemented by still further filters of both higher and lower bandpasses, thereby greatly extending the use of the instrument. Indeed, when the invention is employed as a harmonic analyzer, selectivity which is usually obtainable only from crystal filters may easily be reached and surpassed.

In order to check and adjust the instrument, particularly the gain of low frequency amplifier 32, a gain control 46 and a source of standard voltage 47 are also employed in the instrument. The gain control 46 is designed to vary the screen potential applied to amplifier stages 33 and 34 from voltage source 48, thereby to change the mutual conductance of the tubes 33 and 34 in a well known manner. Standard voltage source 47 comprises an iron wire regulator 49 in series with a small but accurate resistance 50 connected across the 6.3 volt A.C. filament supply 51 of the instrument. By this arrangement, a low A.C. voltage is obtained across resistance 50 which can be made constant to better than one percent, with ten percent variations in the A.C. line voltage. The standard source 47 includes a test switch 52; and upon depression of switch 52, a 100 microvolt signal is connected across the input of low frequency amplifier 32, with any other signal which might be present on line 31 being short-circuited by the low resistance of the source 47. If the gain of the amplifier is, for example, 10,000, a one volt signal must appear on meter 36 (which may be full-scale on the meter) upon application of the 100 microvolt test signal mentioned. Any variation in the gain from this desired 10,000 figure may be readjusted to that value by appropriate variation of gain control 46.

If the frequency to be measured is a very high frequency (several hundred or thousand mc.), converter 24 may be of the germanium or silicon crystal type, similar to the ones employed in superheterodyne receivers used at the above frequencies. The form of oscillator 25 may also be changed correspondingly from lumped constants to transmission lines or cavities.

While I have thus described a preferred embodiment of the present invention, it must be emphasized that the foregoing description is meant to be illustrative only and should not be considered limitative of my invention. Various modifications may be made, and certain of these have already been described. All such variations and modifications as are within the principles of the invention are meant to fall within the scope of the appended claims:

Having thus described my invention, I claim:

1. A measuring instrument comprising an A.C. voltmeter, a band-pass A.C. amplifier having an output operatively coupled to said voltmeter, said amplifier exhibiting a substantially flat frequency response characteristic over an operating region having a predetermined first and relatively low cut-off frequency and a predetermined second and relatively high cut-off frequency, input means for applying an alternating current voltage to be measured to said instrument, frequency converter means having an input coupled to said input means, heterodyning oscillator means operably associated with said converter means, said oscillator means including adjustable frequency control means to convert an input voltage having a frequency above said operating region to a beat frequency output voltage having a frequency within said operating region, means coupling said output voltage from the output of said converter means to the input of said amplifier, and means for periodically varying the beat frequency output of said converter means within a deviation range substantially greater than twice the range between zero and said first cut-off frequency, the response time constant of said voltmeter being large compared with the period of said frequency variation.

2. A measuring instrument comprising an A.C. voltmeter, a band-pass A.C. amplifier having an output operatively coupled to said voltmeter, said amplifier exhibiting a substantially flat frequency response characteristic over an operating region having a predetermined first and relatively low cut-off frequency and a predetermined second and relatively high cut-off frequency, input means for applying an alternating current voltage to be measured to said instrument, frequency converter means having an input coupled to said input means, heterodyning oscillator means operatively associated with said converter means, said oscillator means including adjustable frequency control means to convert an input voltage having a frequency above said operating region to a beat frequency output voltage having a frequency within said operating region, means coupling said output voltage from the output of said converter means to the input of said amplifier, means for periodically varying the beat frequency output of said converter means within a deviation range substantially greater than twice the range between zero and said first cut-off frequency, a plurality of low-pass filters having predetermined ranges corresponding to different partial ranges of said amplifier operating region, and means for selectively connecting said filters between said converter means and said amplifier.

3. A measuring instrument as claimed in claim 1, including switch means for by-passing said converter means, to apply an input voltage having a frequency within said amplifier operating region from said input means directly to said band-pass amplifier.

4. The combination of claim 1 including low-pass filter means between the output of said converter means and the input of said amplifier, and switching means for rendering said low-pass filter means selectively operative to limit the band of frequencies to be measured by said instrument.

5. A measuring instrument comprising a vacuum tube voltmeter, a band-pass A.C. amplifier having an output operably connected to said voltmeter, said amplifier exhibiting a substantially flat frequency response characteristic over an operating range having a first cut-off frequency of the order of 10 cycles per second and a second cut-off frequency of the order of one megacycle per second or higher, input means for applying an alternating current input voltage to be measured to said instrument, frequency converter means having an input coupled to said input means, heterodyning oscillator means operably associated with said converter means and including adjustable frequency control means, to convert an input frequency above said range to a beat frequency output voltage coinciding with a frequency within said range, means coupling the output of said converter means to the input of said amplifier, and means for periodically varying the frequency of said oscillator means within a deviation range of a few kilocycles and at a rate at which the response time constant of said voltmeter exceeds the frequency variation period of said oscillator means.

References Cited by the Examiner
UNITED STATES PATENTS

| | | | |
|---|---|---|---|
| 2,014,102 | 9/35 | Conklin | 324—123 |
| 2,140,016 | 12/38 | Kauter | 324—120 |
| 2,201,020 | 5/40 | Bagno | 324—120 |
| 2,451,320 | 10/48 | Clammer et al. | 250—39 X |
| 2,522,369 | 9/50 | Guanella | 324—128 |
| 2,613,236 | 10/52 | Palevsky | 324—118 |
| 2,879,382 | 3/59 | Freen | 324—115 |

WALTER L. CARLSON, *Primary Examiner.*

MILTON M. FIELD, FREDERICK M. STRADER,
*Examiners.*